Sept. 18, 1928.
A. MELDRUM
SECTIONAL WHEEL
Filed April 23, 1925
1,684,552
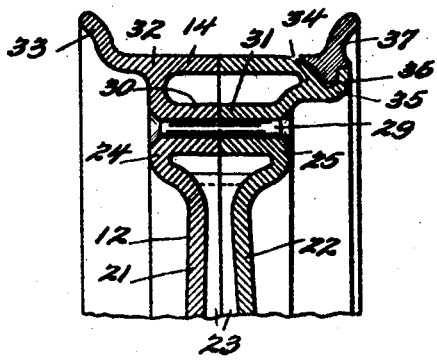
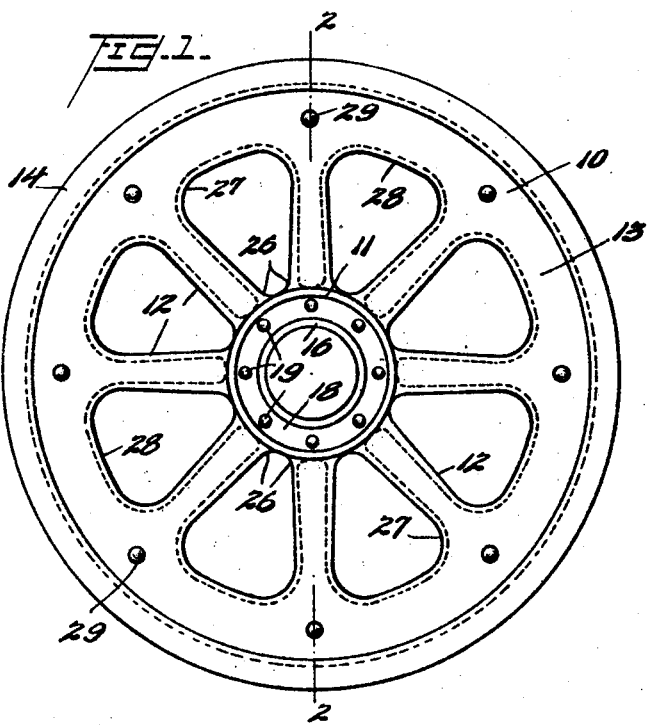
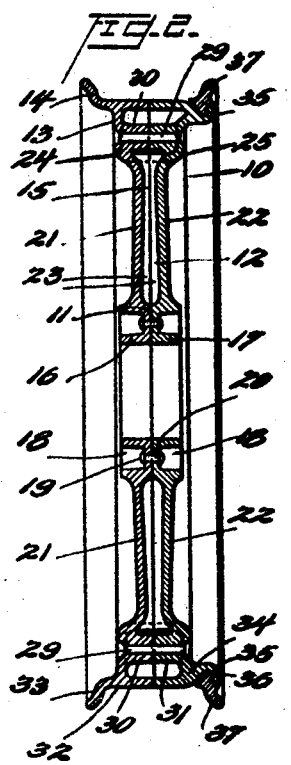

Patented Sept. 18, 1928.

1,684,552

UNITED STATES PATENT OFFICE.

ALEXANDER MELDRUM, OF SYRACUSE, NEW YORK.

SECTIONAL WHEEL.

Application filed April 23, 1925. Serial No. 25,382.

This invention relates to sectional wheels and more particularly to two-part cast metal wheels for use on automobiles, motor trucks, and other vehicles requiring a light and strong wheel.

It is a general object of this invention to provide a novel and improved sectional vehicle wheel.

More particularly it is an object of the present invention to provide a two-part cast metal vehicle wheel the parts being joined on or near the median plane and securely fastened together both at the hub and felloe.

Other and further objects will be more apparent to those skilled in the art as the description proceeds.

For a complete understanding of the present invention, reference should be had to the accompanying drawing and following specification wherein is disclosed a single exemplary structure with the understanding however that various changes may be made in the size, shape, arrangement, proportion and material of the various parts without departing from the spirit of the invention or the scope of the appended claim.

In said drawing:

Fig. 1 is a side elevation of a complete vehicle wheel constructed according to the present invention;

Fig. 2 is a section on line 2—2 of Fig. 1; and

Fig. 3 is a partial section on the same line to an enlarged scale.

In the manufacture of cast metal vehicle wheels it has been common practice to cast the hub, spokes and felloe integral but this method of casting is objectionable in that it requires the use of cores to form the spokes and felloe hollow. These cores are expensive to construct and their use is attended with difficulties. Among these are breakage of the arms of the core, displacement or bending of the arms and floating of the core. The latter two of these difficulties result in spokes and felloe having walls of unequal thickness and with the last difficulty the walls on one side of all of the spokes and the felloe may be extremely thin, but it is almost impossible to detect this defect without breaking the wheel. The present invention contemplates forming the wheel in two complementary sections joined substantially along a median plane so that the two sections can be cast separately and the spokes and felloe formed hollow without the use of cores, thus very materially simplifying the casting operation, reducing the cost and insuring uniform thickness of spoke and felloe walls. At the same time this method of casting allows the rim sections to be formed integral with the felloe sections owing to the direction in which the pattern is drawn from the sand in molding. This feature is not present in the one-piece constructions in which the rim must be fastened on separately. A separate rim does not reinforce and strengthen the wheel to the same extent as does an integral rim and it is liable to wobble.

Referring to the drawing there is disclosed at 10 a metal wheel, the particular embodiment disclosed being like that for use on an automobile. The wheel comprises the hub portion 11, the spokes 12, the felloe 13 and the rim 14. Each of these component parts is formed in two pieces abutting and joined along the plane 15, as shown in Figs. 2 and 3. This may or may not be a median plane but it should pass substantially through the centers of the spokes. The hub sections 16 and 17 forming the completed hub 11, are annular in form and have plane surfaces where they are adapted to abut. Each of the sections is provided with the annular channel 18 for the reception of the rivet heads 19 on the rivets 20 which pass through the hub parts and secure them together. These channels may also serve for the reception of flanges on mounting members and for nuts for securing the wheel to the inner hub portion, not shown, which carries the bearings.

Radiating from the hub sections 16 and 17 are the half spoke sections 21 and 22 identical in structure and of any desired configuration so that when the two sections are placed together, a suitably shaped spoke is obtained, preferably cylindrical or elliptical. Each half spoke section is provided with the channel 23 on its inner face for the sake of lightness and the edges of the spoke sections meet along the plane 15 with a close fit.

Complementary felloe portions 24 and 25 are formed integral with the spoke portions as shown, and are each hollow so that the completed felloe, formed by joining the two sections together, is substantially rectangular in cross section and simulates, in appearance, the usual felloe of an artillery wheel. Substantial fillets 26 and 27 are provided where the spoke sections join the hub and felloe sections respectively, to increase the strength at these points, to eliminate casting strains and cracks, and to facilitate cleaning of the wheel.

Between the spokes, portions 28 of the felloe sections meet along the plane 15 to close the felloe.

The two sections of the wheel are adapted to be joined at the hub and at the felloe. The method of joining these sections at the hub has already been explained. By reference to Figure 3 it will be seen that the felloe sections are joined together by the rivets 29, one placed opposite the end of a spoke. The number of rivets may be reduced or augmented, depending upon the amount of tire pressure carried which must be resisted by these rivets. The rivets extend from side to side of the completed felloe and pass through the bosses 30 and 31, each cast integral with its respective felloe section and projecting inwardly to meet the corresponding boss along the plane 15 so that the rivets 29 may be drawn up tight without danger of crushing or straining the felloe sections.

As seen in Fig. 3 the left section of the wheel carries the rim portion 32 having the side flange 33, here shown as of a type to receive a straight side tire, although of course a clincher rim could readily be substituted. The right section of the wheel is provided with the rim section 34 having the drop side 35 provided with a groove 36 for the reception of the well known form of side ring 37, which is removable for the purpose of tire replacement, and which is locked in position by the tire itself when inflated. It will be noted that these two rim sections meet along the plane 15 and are each supported by their respective felloe sections, substantially in a radial plane, beneath the toe of the tire so that there is no tendency for these rim sections to cant about the felloe portions. This tendency is further counteracted of course by the shape of the rim.

The wheel is so designed that the felloe portions do not extend a material distance beyond the plane of the hub face and thus on the inside, or side of the wheel mounted against the vehicle there is provided room for a very large brake drum. Present day brake practice calls for such large drums and it will be seen that there is ample clearance for brake bands and other appurtenances clear to the under side of the rim and therefore it will be seen that this type of wheel provides maximum brake mechanism clearance without the necessity of offsetting the spokes which materially reduces their strength.

The only machining required in the production of these wheels consists in planing or milling the abutting faces of the two sections and drilling the necessary rivet holes in the hub and felloe sections.

Having thus described the invention what is claimed as new and desired to be secured by Letters Patent is:

In a vehicle wheel, in combination, integral complementary sections each including integral parts which when the sections are placed together form a solid hub, hollow spokes radiating therefrom, a hollow felloe and a rim closing the outer side of said felloe, rivets securing said sections together at the hub and felloe and a boss on each felloe section surrounding each rivet, said bosses abutting to prevent crushing of the rim during riveting.

In testimony whereof I hereunto affix my signature.

ALEXANDER MELDRUM.